Nov. 14, 1939.  L. M. PERSONS  2,180,018
DIAPHRAGM-ACTUATED TRANSMISSION MEANS
Filed May 14, 1936   2 Sheets-Sheet 2
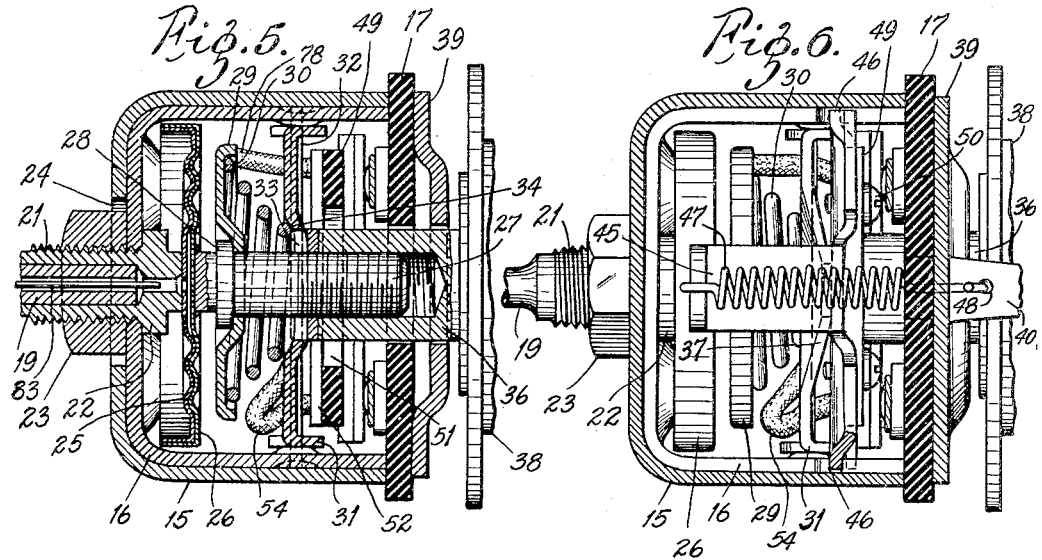
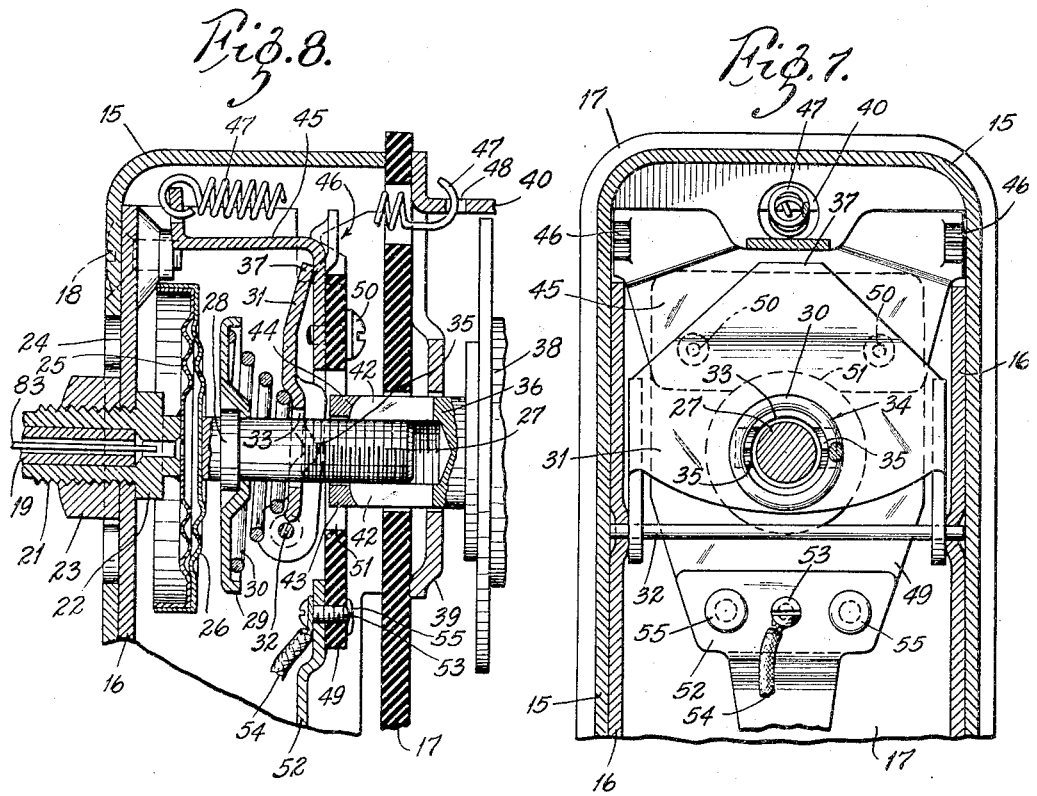
INVENTOR:
LAWRENCE M. PERSONS
By Lawrence Kingsland
ATTORNEY.

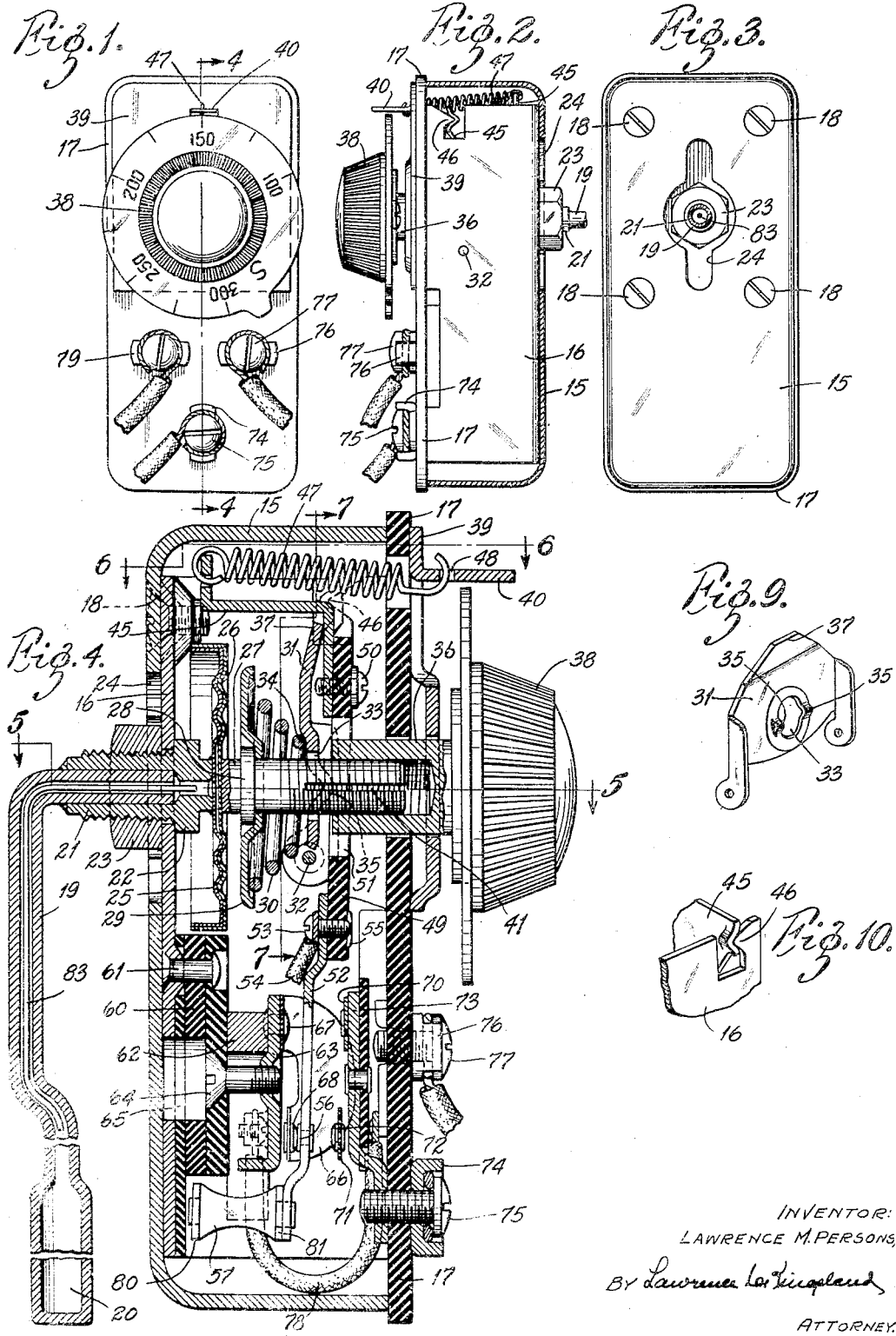

Patented Nov. 14, 1939

2,180,018

UNITED STATES PATENT OFFICE 2,180,018

DIAPHRAGM-ACTUATED TRANSMISSION MEANS

Lawrence M. Persons, St. Louis, Mo., assignor, by mesne assignments, to Automatic Control Corporation, St. Louis, Mo., a corporation of Delaware Application May 14, 1936, Serial No. 79,736

18 Claims. (Cl. 200—83)

The present invention relates to a thermostatically operated switch, and to means for transmitting the motion of the thermal element thereof to the switch elements. It is particularly related to a device wherein the movement of the thermal element is extremely small, being in the nature of a few thousandths of an inch.

It is an object, therefore, of the invention to provide means for transmitting the extremely small motion of a thermal element into the relatively greater motion of switch elements or the like.

The invention further comprehends means for adjusting the thermal element so that the switch will operate at different temperatures.

It is a further object of the invention to provide such adjusting mechanism and to make such adjusting mechanism a part of the transmission means.

It is a further object of the invention to incorporate a lost-motion take-up for the transmission means into the adjusting mechanism.

It is a further object to provide a member directly on the thermal element and secured thereto, to which the lost-motion means and the adjusting mechanism may be attached.

It is a further object of the invention to provide a particular type of switch mechanism especially applicable in connection with the transmission means described.

The invention comprehends in particular the use of a diaphragm thermal element operable on a minimum quantity of heat-responsive fluid.

It is a further object of the invention to provide means reducing the quantity of this fluid present at the switch mechanism whereby to minimize extrinsic expansion and contraction of collateral elements of the device.

It is a further object, in connection with the previous object, to provide means preventing breakage of the conduit conveying the fluid to the diaphragms.

It is a further object of the invention to provide a thermostat designed to avoid changing the differential by the heat within the casing, such as is produced by the passage of current therein.

It is a further object of the invention to minimize the adverse effect of extraneous ambient temperatures upon the thermostat.

In the drawings—

Fig. 1 is a front view of the switch unit showing the external electrical connections.

Fig. 2 is a side view of Fig. 1 with the outside casing shown in section.

Fig. 3 is a back view.

Fig. 4 is a section on the line 4—4 of Fig. 1.

Fig. 5 is a section on the line 5—5 of Fig. 4.

Fig. 6 is a section on the line 6—6 of Fig. 4.

Fig. 7 is a section on the line 7—7 of Fig. 4.

Fig. 8 is a fractional view similar to Fig. 4, but showing the diaphragms separated, the separation being exaggerated for clarity.

Fig. 9 is a view of the primary transmission lever.

Fig. 10 shows the pivot mounting of the secondary lever.

The switch is enclosed in a casing 15. Within the casing is a U-shaped frame 16, to the front of which is secured an insulating plate 17. The frame 16 and the plate 17 form a housing open at its ends. The screws 18 hold the outer casing 15 to the frame 16. Extending through the back of the frame 16 and of the casing 15 is a tubular conduit having at one end a bulb or equivalent means 20 adapted to be located in the place, the heat of which is controlled. The tube 19 terminates at its other end in a tubular stud 21 having a shoulder 22 and threaded to receive the securing nut 23. The casing 15 is provided with an opening 24 to receive the nut 23. The casing 16 is thereby clamped between the shoulder 22 and the nut 23 to hold the stud and the mechanism supported thereon to the frame 16. A pair of diaphragms 25 and 26 are secured together at their peripheries, and normally they are contiguous throughout substantially all of their faces, as is shown in Fig. 4. The diaphragm 25 is secured to the tubluar stud 21 and is in communication with the bore therethrough. By this means, the fluid transmitted by the tube 19 from the suitable bulb 20 acts to separate the diaphragm 26 from the fixed diaphragm 25 to the position shown in Fig. 8. Preferably, the fluid in the conduit 19, the bulb 20 and the stud 21 fills the entire space therein so that no air is present in the system. However, when the fluid is cold, the diaphragms are contiguous, as shown in Fig. 4; and separate only when the fluid is heated. The fluid may comprise a suitable liquid.

Secured to the diaphragm 26 is a solid stud 27.

having a shoulder 28 thereon and threaded at its outer end. A washer 29 rests against the shoulder 28 and forms an abutment for a conically-wound coil spring 30. A primary lever plate 31 supported on a pivot bar 32 has an opening 33 to receive the stud 27. This lever plate likewise has a seat portion 34 to form an abutment opposite to the washer 29 to receive the spring 30. The lever plate 31 has upstanding elements 35 thereon that rest against a sleeve 36 threaded for movement upon the outer end of the stud 27 toward or from the diaphragms. The primary lever 31 is likewise provided with an actuating end 37.

The sleeve 36 has on the outer end thereof a handle 38 having a dial thereon. A plate 39 is secured to the outside of the insulating plate 17. An index 40 is struck upwardly from the plate 39 to cooperate with the dial. A stop is provided on the dial to act against the index 40.

To retain the sleeve 36 frictionally upon the stud 27, the stud may be split as at 41, in Fig. 4, and the ends parted slightly, or the sleeve may be split as at 42, in Fig. 8, and its ends contracted slightly. In the latter case, it is necessary to have a washer 43. The end of the sleeve is made spherical, and the washer complementary thereto, as at 44, to cause the washer automatically to center itself. This arrangement of Fig. 8 compensates for irregularities in drilling the sleeve 36, and insures that the sleeve will abut both lugs 35 on the primary lever 31 with equal pressure.

A secondary lever 45 rocks on knife edge pivots 46, shown in detail in Fig. 10. The secondary lever has a spring 47 secured to one end thereof and also removably secured through an opening 48 in the index 40. Thus referring to Fig. 4, the spring 47 draws the secondary lever 45 in a clockwise direction about its pivots 46. The contact end 37 of the primary lever 31 engages the secondary lever at a point very close to the pivots. An insulating plate 49 is secured by screws 50 to the secondary lever 45 and comprises an extension thereof. This insulating plate has a hole therein 51 to receive the stud 27 and the sleeve 36. To the outer end of this insulating plate is secured a switch blade 52 attached to the plate by means of screws 53. The screws 53 also bring a switch lead 54 to the switch blade 52. The switch blade may be further attached to the insulating plate 49 by suitable means, such as the rivets 55. It will be understood that the switch blade 52 comprises an additional extension of the secondary lever 45. The switch blade is provided with a contact 56 and has secured to the outer end thereof a double armature 57 to be described in more detail subsequently.

Secured to the back of the frame 16 is a double insulating block 60, it being secured by means such as rivets 61. A permanent horse shoe magnet 62 is held between a switch backing plate 63 and the insulating block 60 by means of a removable screw 64. A hole 65 is provided through the frame 16 and the insulating block 60 to give access to the screw 64. It will be understood that the armature 57 operates between the poles of the magnet 62. A switch plate 66 comprising a relatively thin flexible element of U-shaped configuration has one leg thereof secured to the switch backing plate by means such as the rivet 67. The connecting portion of the U-shaped switch plate 66 is turned at an angle to the fixed leg thereof. The other leg of the plate 66 is turned at a similar angle and supports for restricted movement a switch contact 68. This switch plate is described in detail in my copending application Serial No. 80,090, filed May 16, 1936.

The switch shown is a double-acting switch. A second switch plate similar to the plate 66, the legs of which are shown in Fig. 4 at 70 and 71, is supported on the plate 17. The leg 71 includes a contact 72. The leg 70 is mounted on a supporting element 73 secured to the front plate 17 and has a terminal 74 and a connecting screw 75. A terminal 76 having a screw 77 is connected to the lead 78 that, in turn, is connected to the switch backing plate 63. The lead 54 is connected to the terminal 79, shown in Fig. 1, and which is similar in all respects to the terminal 76.

The armature 57 is non-permeable, but has two permeable armature plates 80 and 81 at opposite ends thereof. Hence, when either of them is drawn within the magnetic field of the magnet 62, it will be drawn with a snap-action toward the magnet.

Within the tube 20 is a wire 83. This wire extends up approximately to the diaphragm and backwardly a distance of several inches, a four and one-half wire having been found satisfactory. This wire has several functions. In the first place, it reduces the internal volume of the tube 20 and thereby reduces the quantity of thermal fluid adjacent the casing. Since this thermal fluid is hot, it transmits heat to the casing and, in turn, to the various elements of the device, such as the stud 27, etc. Such heat causes said elements to expand and thereby to interfere with the proper action of the mechanism. By reducing the volume of the tube in the neighborhood of the switch, the amount of this hot fluid in this neighborhood is reduced. Consequently, less heat is brought up and, in fact, it can be reduced to a negligible quantity. In effect, there is produced a capillary tube within the limits of the wire. This wire has an additional function in that it prevents kinking of the tube 20. Adjacent the instrument, it is almost invariably necessary to bend the tube, which is metal, in order to fit the instrument into its operating position. The presence of the wire 83 prevents the tube from kinking and thereby avoids the problem of breaking it. The wire reinforces the tube to such an extent that the bulb and tube are self-supporting.

The operation of the device is as follows:

It will be understood that, in the switch mechanism shown, one circuit may be opened in response to heat increase, and another may be closed in response to such increase. The device has been shown as applicable to electric switches. It will be understood, however, that any mechanism may be operated off the outer end of the secondary lever 45, such as a valve or the like.

The thermostat bulb 20 is located at the place, the heat of which is to be controlled. It will be assumed at first that the dial 38 has been set for a desired temperature. When the heat surrounding the thermostat bulb reaches this temperature, the diaphragms will be parted by the expanding liquid to a position such as shown in Fig. 8. The movable diaphragm 26 forces the stud 27 outwardly and puts compression upon the spring 30. Since this spring is a stiff one, it moves the primary lever 31 about its pivot 32. The movement of the stud 27 is magnified at the actuating end 37 of the lever 31, as will be apparent. The lever 31 at its actuating point 37 then moves the secondary lever 45 about its pivots 46. This action is against the relatively light secondary lever return spring 47. The movement is greatly multiplied at the outer end of the secondary lever 45 whereon is mounted the double contact 56. In the present switch, a magnification of as high as 60:1 or 70:1 may be obtained. This is several times higher than any previously known to have been obtained in similar mechanisms. It will be observed that the expanding force produced by the diaphragm is transmitted through the relatively stiff spring 30. This action prevents injury to the mechanism, since the spring can absorb any movement of the diaphragm beyond the limits of movement of the two levers. At the same time, it takes up all lost-motion between the levers and in the adjusting mechanism to be described.

When the diaphragm 26 returns to the left in Fig. 4, upon cooling of the fluid, it draws the stud 27 with it. Since the sleeve 36 is fixed to the stud, and through the elements 35 contacts the primary lever 31, the latter lever is drawn to the left by the action of the diaphragm. In this action, normally the spring 30 is not changed, since the distance between the washer 29 and the lever 31 remains unchanged. If, however, the spring 30 has been compressed by travel of the diaphragm more than the permitted movement of the secondary lever 45, in which case the elements 35 will have been moved beyond the lever 31, necessarily this lost-motion will be obsorbed before the lever 31 is moved by return of the diaphragm, stud, and sleeve. The secondary lever return spring 47 is made only strong enough to maintain that lever in its leftward position; although it may be designed to contribute to the return action of the primary lever, if desired.

The adjusting mechanism includes the sleeve 36 threaded onto the stud 27, to which sleeve is fastened the dial handle 38. When the handle 38 is rotated, it may thread onto the stud 27 until it is nearer to the diaphragm 26. In so moving, the inner end of the sleeve, by its action upon the upstanding elements 35, forces the primary lever 31 about its pivot 32 toward the diaphragm. If the diaphragms are in contact with each other, as they will be when the instrument is cold, this adjusting movement is absorbed in the coil spring 30. The secondary lever 45, by the action of the return spring 47, will follow this movement of the lever 31 and will remain in contact therewith unless the secondary lever reaches an extreme limit of its motion. However, by this action, the outer end of the secondary lever 45 will have been moved further to the left, as shown in Fig. 4, so that its contact 56 is nearer the contact 68 and more remote from the contact 72.

With the device in this position, when the fluid expands and separates the diaphragms, a considerable expansion and consequent parting of the diaphragms is necessary before the secondary lever 45 is moved to the starting position it occupied before the adjustment. Consequently, greater heat is required to open the circuit controlled from the contact 68 and to close the circuit from the contact 72. The converse is obviously true in that the heat required for this operation may be lessened by the reverse turning of the handle 38.

The sleeve 36 is maintained in adjusted position by the slot 41 of Fig. 4, or the slot 42 of Fig. 8. Also, the pressure of the spring 30 against it tends to hold it in position. The mounting of the adjusting mechanism directly on the diaphragm instead of on a fixed part of the device eliminates the necessity of having relatively movable parts between the two that add friction and interfere with the free action of the device.

The coil spring 30, therefore, takes up lost-motion in the adjusting mechanism and the levers, and constitutes a resilient transmission means communicating movement of the diaphragm in expansion to the lever 31.

The switch blade, as it moves from one of its positions to the other, will bring the respective one or the other of the armature plates 80 and 81 into the field of the magnet 62 and, at the same time, will remove the other of said plates from that field. Thus, the last part of the movement of the switch blade occurs with a snap-action by the effect of the magnetic field upon the respective armature plate.

With the connections disclosed, the switch may be used to control two circuits. For illustration, it may be applicable both to a heating system and a refrigerating system at the same time. Should the temperature reach a certain point so that the switch plate 52 is moved to the right to close the contact 72, a refrigerating system may be then closed into the proper circuit including these contacts; whereas, when the device cools down so that the switch blade 52 moves to the left to close with the contact 68, a furnace blower or any suitable mechanism may be energized to increase the heat. It will be understood, of course, that, normally, both of these two systems would not be working simultaneously. They are given merely for illustrative purposes and other mechanisms could be employed that are used at the same time, but alternately.

The use of a diaphragm control element in this connection, and in the manner shown, is an added advantage. A minimum quantity of heat responsive fluid is outside the bulb and that portion of the tube outside the heated range. A very small quantity is present between the diaphragms when heated, and none when it is cold. Hence only a small percentage of the fluid is subject to the effect of extraneous temperatures, and the device is much more accurate. Also very little fluid is present within the casing, and subject to the heat therein such as is produced by the passage of current therein. This passage of current produces sufficient heat to alter the differential of a thermostat subject thereto.

Purely for illustrative purposes, representative operating ratios of the device may be indicated as follows: the diaphragm movement may be about .030 thousandths of an inch; the primary lever may multiply in the ratio of about 3:1; the secondary lever may multiply in the ratio of about 24:1, producing an overall magnification of 72:1. Since preferably there is no gas in the fluid system, and therefore the liquid expansion is absolute so that for practical purposes the liquid, cold or hot, is incompressible, the spring 30 may be relatively very stiff. By using such a spring with the mechanism described, no lost motions occur that would destroy the accurate operation of the device.

The arrangement of the levers, and the compact operating size of the diaphragms permit the construction of a control of this type that is small. It likewise is simple and free from complexity.

I claim:

1. In a device of the kind described, a first cup-like member, a second and flexible cup-like member secured to the first in sealing relation about its side walls, and normally contiguous throughout with said first member, a liquid adapted to fill completely any space between said members and to move the flexible one upon increase of pressure, an element movable relative to said member, means mounted entirely upon said flexible member, and elements on said means and movable therewith contacting opposite sides of said first named movable element to transmit thereto movement of said expansible member in both directions.

2. In a device of the kind described, a member movable in response to heat changes, a stud secured thereto, a primary lever pivoted on one side of said stud and having an actuating portion at the other side, a secondary lever adapted to receive motion from the actuating portion of the primary lever, and a spring interposed between said stud and said primary lever to transmit the motion of the stud to the primary lever and to urge said primary lever against said secondary lever.

3. In a device of the kind described, a member movable in response to heat changes with a very small movement, a stud secured to said member to move therewith, a primary lever pivoted at one side of the stud and having an actuating portion at the other side, said actuating portion being substantially more remote from the stud than is the pivot, a spring for transmitting the movement of the member and stud to the primary lever, a secondary lever pivoted at a point close to the actuating portion of the primary lever and contacted thereby, and extending many times beyond said pivot and contacting point, and means urging said secondary lever against said primary lever.

4. In a device of the kind described, a frame, a means therein adapted to move very slightly under the influence of heat changes, said means including two diaphragms sealed together peripherally and normally contiguous throughout a major portion of their adjacent surfaces, and fluid-conducting means including a tube attached to one diaphragm communicating in between said diaphragms, whereby to conduct an expanding liquid therebetween and move one diaphragm away from the other, a stud secured to said movable diaphragm to move therewith, motion transmission means operated from said stud, and means securing the fluid conducting means to the frame to support the diaphragm and the stud thereon.

5. In a device of the kind described, a frame, a pair of diaphragms, at least one of which is flexible, sealed together peripherally and separable at their middle portions a very small distance, fluid-conducting means communicating in between said diaphragms, said fluid-conducting means having an incompressible fluid therein to fill the fluid space but not normally separating the diaphragms, an element maintained against one of said diaphragms for movement therewith, a primary lever pivoted to said frame and having an actuating portion, resilient means transmitting the motion of the diaphragm and element to the lever, and said lever being adapted to multiply said motion at its actuating end, a secondary lever pivoted to said frame at a point close to the actuating end of said primary lever whereby said primary lever may act against said secondary lever, said secondary lever extending a great distance from said point of contact of said primary lever to an actuating end, means urging said secondary lever toward contact with said primary lever, and a snap action means operating on the free end of the secondary lever.

6. In a device of the kind described, a frame, a pair of diaphragms supported on the frame, at least one of which is flexible, sealed together peripherally and separable medially by a small distance, fluid-conducting means communicating between said diaphragms and containing heat-responsive fluid, said diaphragms being at least substantially inseparate when the fluid is cold, and being separated by the expanded fluid when the same is heated, an element adapted to be moved by the separating diaphragm, a spring abutment on said element, a lever pivoted to the frame on one side of said element and having a hole therein through which said element passes, said lever extending a substantial distance on the other side of said element, a spring between said abutment and lever, an adjusting element movable along the element and abutting the lever, whereby to pivot the lever toward the diaphragms, said spring maintaining the lever against the adjusting means and adapted to transmit movement of the diaphragm and the element to the lever.

7. In a device of the kind described, a pair of diaphragms, at least one of which is flexible, peripherally sealed together, and separable by a small distance medially, said diaphragms being normally at least substantially in contact, a fluid-conducting means to which one diaphragm is secured, said fluid-conducting means communicating between said diaphragms, a motion transmitting element secured to said other diaphragm to move therewith, a primary lever, a spring for resiliently transmitting the movement of the diaphragm and motion transmitting element to the primary lever, a secondary lever adapted to receive the motion of the primary lever and multiply the same, a second spring weaker than the first for maintaining the secondary lever in contact with the primary lever, a contact element in contact with the primary lever, a contact element on said secondary lever, and two relatively fixed contacts, one to close with the lever contact at one extreme of the movement of the secondary lever, and the other to close with the lever contact at the other extreme.

8. In a device of the kind described, a substantially incompressible member movable in response to changes in physical conditions, a movable element, means for transmitting movement of said member to the element including resilient means for transmitting the movement to the element in one direction, and an adjustable abutment on said transmitting means for transmitting the movement in the other direction.

9. In a device of the kind described, a member movable in response to physical changes, a motion transmitting means on said member, an element adapted to be moved, and a spring interposed between said element and said means and acting upon one side of said element, an abutment on said means and opposite said spring, said spring urging said element against said abument whereby said spring may move the element in one direction upon movement of the movable member, and said abutment may move the element in the other direction.

10. In a device of the kind described, a member movable in respect to physical changes, a motion transmitting means supported on said member, a freely movable element, a spring interposed between said means and said element, and an adjustable abutment on said means and acting on said element opposite said spring.

11. In a device of the kind described, a frame, a member movable in respect to physical changes, means mounting said member on said frame, a stud secured to and projecting from said movable member, a sleeve adjustably mounted on said stud and projecting from said frame so as to be accessible, means for adjusting said sleeve on said stud, a movable element mounted on said frame between said sleeve and said movable member, and means urging said element against said sleeve whereby movement of the latter with said movable member will be transmitted to said element.

12. In a device of the kind described, a member movable in response to physical changes, a threaded stud secured to said member, a sleeve threaded onto said stud, an element adapted to be moved and located between said sleeve and said member, and a spring surrounding said stud to maintain the movable element against the sleeve.

13. In a device of the kind described, a frame, a thermal unit adapted to be mounted on said frame, said unit including a pair of disc-like members secured together peripherally and at least one of which is flexible, a stud secured to said flexible member for movement therewith, a sleeve adjustably secured onto said stud, and means to secure the other of said members than that having the stud, to said frame whereby to support said unit thereon.

14. A device as in claim 13, together with resilient means on said unit interposed between said flexible member and said sleeve.

15. In a device of the kind described, a frame having back and front members, a thermal unit including a pair of disc-like members peripherally joined, and at least one of which is flexible, said flexible member having a stud secured thereto and movable therewith, a sleeve adjustably mounted on said stud and projecting through the front member of said frame, indicating means on said stud, the other of said disc-like members having secured thereto means for mounting the unit on the back member of the frame.

16. In a device of the kind described, a frame having back and front members, a lever pivoted to said frame between said back and front members, a thermal unit for moving said lever including a pair of disc-like members at least one of which is flexible, and adapted to receive varying quantities of liquid between them whereby to move said flexible member, said flexible member being toward the front of the frame, a stud secured to said flexible member, a sleeve threaded onto said stud for adjustment thereon, means on said stud urging said lever into contact with said sleeve, said sleeve projecting through the front member of said frame, means outside said frame to said sleeve, and means to indicate the position thereof.

17. In a device of the kind described, a pair of disc-like members secured together around their edges, and at least one of which is flexible, a stud maintained against the flexible member to move therewith, a sleeve adjustably mounted on the stud, a spring surrounding the stud between the sleeve and the flexible member, means on the stud to hold one end of the spring and to move said end with movements of the stud, and an actuated element mounted between the spring and the sleeve, normally maintained by the spring against the sleeve, and caused by the sleeve and spring to follow movements of the stud.

18. In a device of the kind described, a base, a member movable in response to changes in physical conditions, a stud maintained against said member to move therewith, an adjustable sleeve on said member, an actuated element on the base and contacting the sleeve, a spring adapted at all times to resiliently urge the actuated element against the sleeve so that the element will be caused to follow the sleeve as the same is withdrawn, and will be moved directly by the sleeve as it returns, and a cut-off operated by the actuated element.

LAWRENCE M. PERSONS.